United States Patent [19]
Williamson et al.

[11] Patent Number: 4,656,957
[45] Date of Patent: Apr. 14, 1987

[54] LIQUID FERTILIZER APPLICATOR

[75] Inventors: Gerald E. Williamson, Macomb; Carroll D. Noland, Rushville, both of Ill.

[73] Assignee: Yetter Manufacturing Company, Colchester, Ill.

[21] Appl. No.: 790,398

[22] Filed: Oct. 23, 1985

Related U.S. Application Data

[63] Continuation-in-part of Ser. No. 682,280, Dec. 14, 1984, abandoned.

[51] Int. Cl.⁴ ............................................. A01D 23/02
[52] U.S. Cl. ........................................ 111/7; 172/166; 172/763
[58] Field of Search .................... 111/1, 7, 85, 86, 87; 172/763, 166, 736–741, 743

[56] References Cited

U.S. PATENT DOCUMENTS

| 562,755 | 6/1896 | Banwarth | 111/85 |
| 2,001,003 | 5/1935 | Tuft | 111/86 |
| 2,489,385 | 11/1949 | Paul | 111/87 |
| 3,188,989 | 6/1965 | Johnston | 111/7 |
| 3,237,577 | 3/1966 | Wilkins | 111/7 |
| 3,292,562 | 12/1966 | Clark | 111/7 |
| 3,319,589 | 5/1967 | Moran | 111/7 |
| 3,799,079 | 3/1974 | Dietrich | 111/7 |
| 4,466,364 | 8/1984 | Hassenfritz | 111/1 |
| 4,538,532 | 9/1985 | Coker | 111/7 |

FOREIGN PATENT DOCUMENTS

| 590486 | 1/1960 | Canada | 111/87 |
| 1430726 | 1/1966 | France | 111/87 |
| 089932 | 7/1967 | France | 111/87 |
| 1098018 | 1/1968 | United Kingdom | 111/87 |
| 157853 | 3/1962 | U.S.S.R. | 111/85 |

Primary Examiner—Richard J. Johnson
Assistant Examiner—Danton Demille
Attorney, Agent, or Firm—Mann, McWilliams, Zummer & Sweeney

[57] ABSTRACT

A liquid fertilizer applicator is provided, designed to be pulled by a motive power source, for use in a variety of soil and tillage conditions. It includes a disc-shaped coulter and an associated applicator knife mounted in trailing relation to the coulter, with a feed tube fixed to the rear of the knife. The leading edge of the arcuate knife conforms to and lies in close proximity to the outer periphery of the coulter disc. An alternative arrangement includes a knife with an angled lower facing edge and a heel extension to protect the feed tube opening.

8 Claims, 4 Drawing Figures

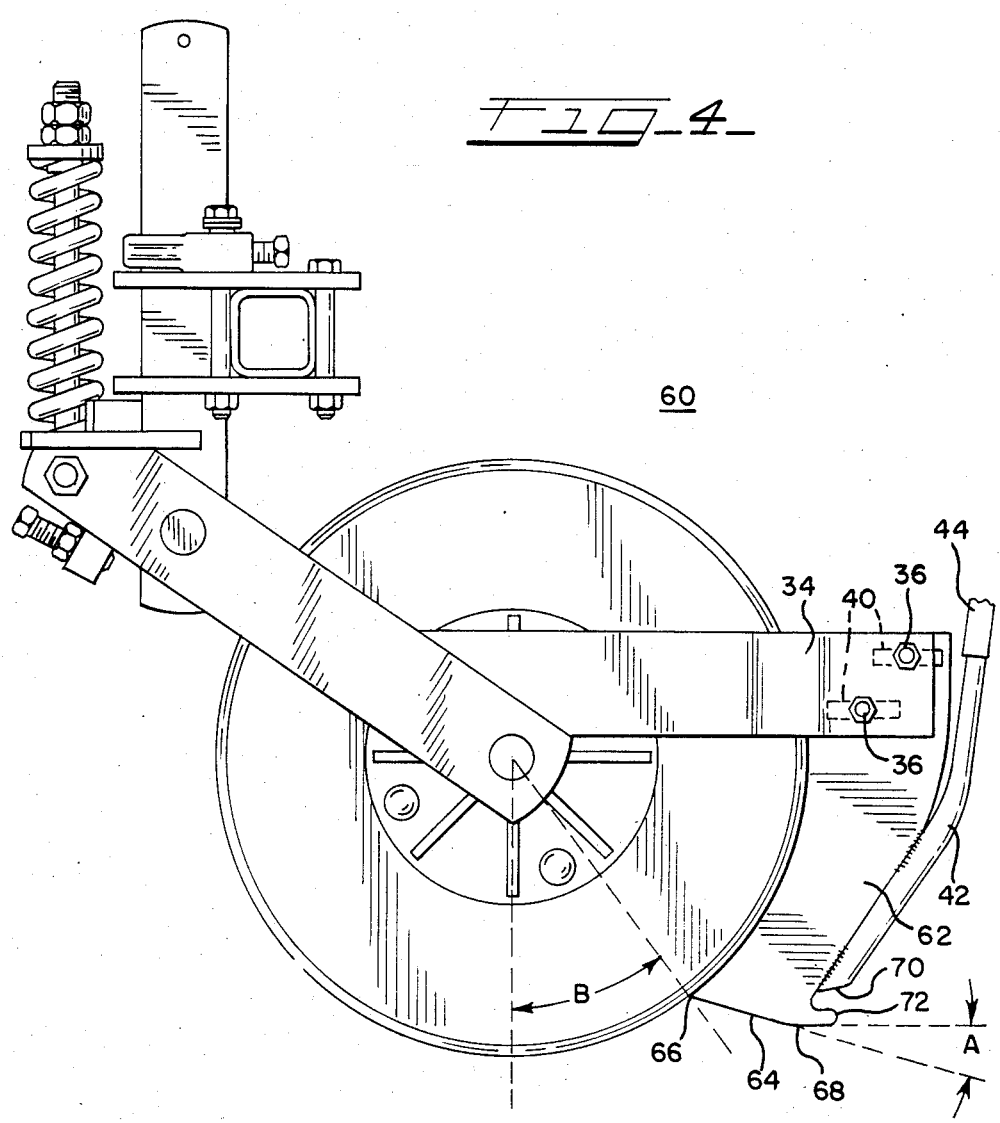

LIQUID FERTILIZER APPLICATOR

This application is a continuation-in-part of application Ser. No. 682,280, filed Dec. 14, 1984, now abandoned.

FIELD OF THE INVENTION

This invention relates to the field of agricultural implements drawn by motive power sources such as tractors and used to incorporate various liquid preparations into the soil. This type of implement typically includes a rotatably mounted disc-shaped coulter which forms a trench in the soil. The coulter is trailed by a knife which has attached to its trailing portion a tube through which liquid fertilizer is incorporated into the soil.

It is common for the implement to encounter grass, weeds or other trash in the field. When this occurs, the trash is caught between the coulter and the knife and forms a wad of material. This wad of material passing through the trench slit by the coulter widens the trench and throws up soil to form ridges on either side of the trench. Since these fertilizer applicators are followed, in practice, by seed planters whose wheels ride on trenches formed by the fertilizer applicators, such ridges would cause seed placement at too shallow a depth for proper planting. Additionally, these wider trenches are undesirable since they promote the erosion of sloping fields.

DESCRIPTION OF THE PRIOR ART

The prior art includes liquid fertilizer applicators having disc-shaped coulters and trailing knives spaced substantially therefrom or mounted tangentially thereto. Liquid fertilizer applicators of this type are shown in the following examples of prior art.

Wilkins U.S. Pat. No. 3,237,577 covers an ammonia applicator with a coulter and straight-edged knife arranged so that the knife trails the coulter in tangential relationship thereto so that a substantial gap exists between the coulter and the knife at ground level or above.

Moran U.S. Pat. No. 3,319,589 illustrates a coulter and straight-edged knife with an adjustable horizontal spacing between the two. The knife and coulter are close enough to shear off trash at only one point.

Dietrich U.S. Pat. No. 3,799,079 covers an ammonia applicator including a disc coulter and a curved trailing knife carried in spaced relationship to the coulter.

None of the foregoing examples of prior art discloses an arrangement of components as in the incident invention wherein a disc coulter and knife are arranged to be in close cutting proximity throughout a substantial arcuate range so as to effectively prevent the build-up of trash between the two and thereby to insure fertilizer incorporation into the soil at a uniform, predetermined depth.

SUMMARY OF THE INVENTION

The present invention provides a liquid fertilizer applicator which incorporates a disc coulter with a trailing knife and liquid fertilizer conduit in a unique and novel configuration. The disc coulter and trailing knife are arranged in very close proximity to each other so that as the tool is pulled along a planting row, in a freshly-tilled field, any grass or other trash encountered will be cut by the interaction between the two. This prevents the build-up of any such matter which would have the tendency to drag through the soil and create a trench wider than that formed by a clean coulter and knife. The soil from such a trench would, of necessity, mound up on either side of the trench raising the level of the ground at that point forming a ridge on either side of the trench. Since the fertilizer applicator is followed by a seed planter riding on depth gauge wheels, a true ground level is important for proper depth of seed placement. Such a ridge would raise the planter and result in shallow or uneven seed placement. The wider trenches formed would promote erosion in sloping fields by rain water run-off.

This arrangement is particularly effective in spring tilled or chisel tilled conditions, where an abundance of fiberous material is encountered. The applicator is equally effective in conventional till situations where the field may be plowed in the autumn and worked in the spring when fiberous material will have decayed, and in so-called no-till conditions where the sharp edged coulter may slice through the trash encountered on a hard surfaced field.

The improved effectiveness of the present arrangement is accomplished by the combination of a disc coulter and an arcuately shaped trailing knife positioned in uniform and adjacent proximity to the coulter defining a minimum clearance between the knife and the coulter from a point slightly behind and slightly above the lower most point of the coulter to a point above and behind the central axis of the coulter. This gap should be set at no more than one-eighth inch.

Horizontal adjustment means are provided to compensate for wear between the coulter and the knife, to maintain a uniform, proximate relationship between the two.

DESCRIPTION OF THE DRAWINGS

FIG. 4 is a side plan view of an alternative embodiment of the coulter-knife arrangement and its associated hardware.

DESCRIPTION OF THE PREFERRED EMBODIMENT

Figure 1:
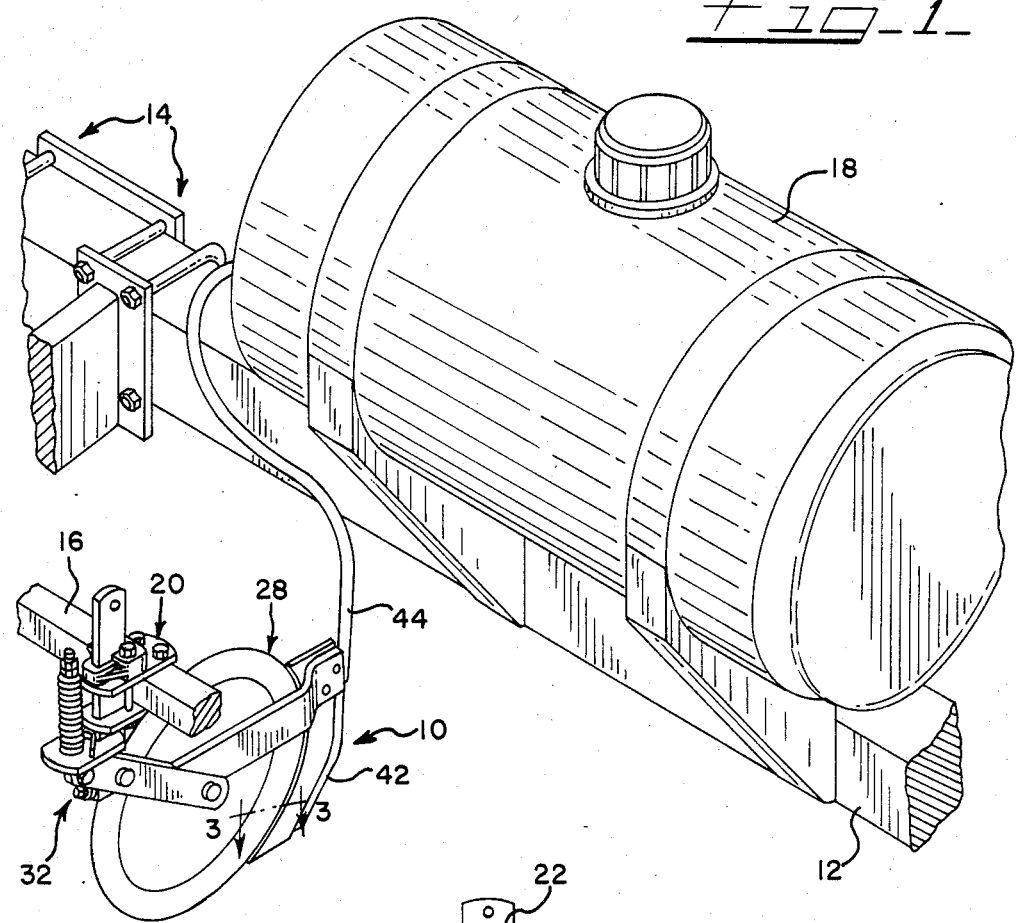
FIG. 1 is a perspective view of a liquid fertilizer applicator embodying the present invention.

This invention relates to a agricultural liquid fertilizer applicator which may be used in a variety of field conditions, and is especially useful in field conditions in which grass or other trash is present on the surface of the soil, at the time, the operator wishes to incorporate liquid fertilizer into the soil.

In the drawings, the reference 10 indicates a liquid fertilizer applicator embodying the present invention. The entire apparatus is mounted to an agricultural tool bar 12 adapted to be pulled by a motive power source such as a tractor. Clamp member 14 fixes horizontal cross member 16 in a fixed, forward relationship to tool bar 12.

Tank 18 is mounted to tool bar 12 as shown in the drawing. Applicator 10 is mounted to cross bar 16.

Figure 2:
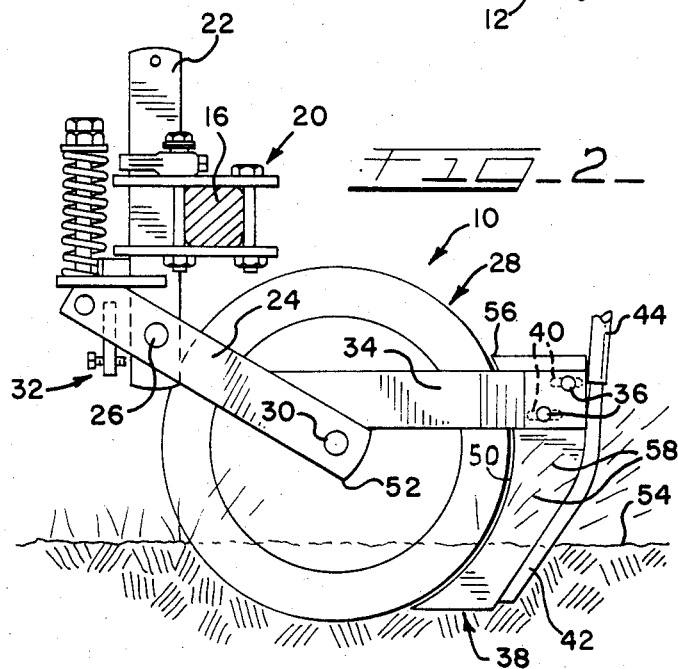
FIG. 2 is a side plan view of the coulter-knife arrangement and its associated hardware.

Turning to FIG. 2, the various parts of the fertilizer applicator may be seen. Vertical support bar 22 depends from clamp 20 as shown. Coulter swing arm 24 is pivotally mounted to support bar 22 at pivot point 26.

Coulter wheel 28 is rotatably mounted to swing arm 24 at axis 30. Vertical travel of coulter 28 and associated parts are limited by adjustable stop 32.

Knife support arm 34 is fixed to swing arm 24 as shown. Located at the rear of knife support arm 34 are knife fixing bolts 36. Knife 38 is fixed to arm 34 by bolts 36 through horizontal adjustment slots 40, shown in phantom, in knife 38.

Feed tube 42 is welded to the rear of knife 38 and is connected to tank 18 by conduit 44.

Figure 3:
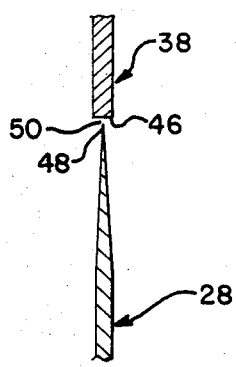
FIG. 3 is a sectional view through the coulter and knife taken along the line 5—5 in FIG. 1.

FIG. 3 illustrates the relationship between the knife and the coulter in the present invention. Leading edge 46 of knife 38 is located no more than one-eighth inch behind outer peripheral edge 48 of coulter 28. As coulter outer peripheral edge 48 wears down through use, gap 50 will widen. The gap may be brought back to within acceptable tolerances by moving the knife closer to the coulter by the attachment bolts 36 and adjustment slots 40. Although gap 50 should be adjusted to no more than one-eighth inch, it is preferable that coulter edge 48 skim knife edge 46, to prevent trash build-up between these two elements.

In use, the applicator may be operated to incorporate liquid fertilizer at various depths below the soil surface depending on the type of crop involved, the type of fertilizer used and soil conditions, among other factors. The coulter may penetrate the soil to a maximum depth whereby the lowermost point 52 of the coulter trailing arm 24 rides just above the soil surface 54. The edge of knife 38 is maintained in close proximity to coulter 28 to a point 56 substantially above point 52 so that even for such deep applications, the device remains effective to prevent grass build-up between coulter and knife. In FIG. 2, grass and trash 58 is shown being shed by knife 38 after being sliced by the knife-coulter arrangement.

An alternative embodiment of applicant's invention is provided, as shown in FIG. 4 of the drawings. This embodiment includes features which improve performance of the unit in minimum-till conditions encountered when the soil is loose and a great deal of trash and grass is mixed in with the soil. In such a minimum-till soil condition, trash tends to hairpin around the leading edge of the coulter wheel, being pushed through the soil but not sliced by the coulter. This trash tends to stay attached to the coulter blade and "ride" the blade's edge as the coulter continues its forward rotation. In these conditions, the previously described embodiment of applicant's invention may not cut through the trash efficiently, allowing it to build up between the coulter blade and knife.

To alleviate this problem, the knife shown in this embodiment is configured and positioned so that most trash encountered by the coulter is shed of the coulter before encountering the knife. In this embodiment, the knife includes a lower facing edge having a relatively small angle of attack to enable it to more easily shed any trash encountered by the knife. It is also provided with a heel extension to protect the feed tube opening.

As shown in FIG. 4, the reference 60 indicates a liquid fertilizer applicator embodying the present invention as generally described in the preceding paragraph. In this embodiment, knife 62 is fixed to arm 34 by bolts 36 through horizontal adjustment slots 40, as in the previous embodiment.

Feed tube 42 is welded to the rear of knife 62 and is connected to the fertilizer tank as in the previously described embodiment.

Knife 62 includes lower facing edge 64 which extends from knife point 66 to heel 68. Lower facing edge 64 is set at an angle of attack A relative to the horizontal direction of forward travel through the soil.

Knife 62 is positioned relative to coulter 28 with knife point 66 located such that the line from the center of axis 30 through the knife point 66 forms an angle B with a vertical line through the center of axis 30, with angle B in the range of 30° to 45°, typically set at around 37°. In this configuration, most trash encountered in minimumtill conditions is shed of the coulter before encountering knife point 66, thus reducing the amount of trash to be cut between the knife and blade, requiring less work by these two components, and thereby extending their useful life.

In this embodiment, knife point 66 has to be high enough with relation to the coulter to enable most trash to be shed before encountering the knife, and the heel 68 of the knife has to be low enough to protect the opening 70 of the feed tube 42 at its appropriate application depth. The angle of the lower facing edge 64 from knife point 66 to heel 68, relative to the horizontal plane, is designated the angle of attack A and should be no greater than 20° because at a greater angle the knife tends to collect trash and the force required to keep it in the soil at the proper depth increases. This angle of attack is typically set at 15°.

Integral heel extension 72 is disposed rearwardly at heel 68. Heel extension 72 extends beneath feed tube opening 70. In some cases, it is necessary to set the coulter assembly on the ground for filling of seed hoppers, and this heel extension protects the tube opening from plugging when the unit is placed on loose soil.

Various features of the invention have been particularly shown and described in connection with the illustrated embodiments of the invention. However, it must be understood that these particular arrangements merely illustrate and that the invention is to be given its fullest interpretation within the terms of the appended claims.

What is claimed is:

1. A liquid fertilizer applicator including:
   (a) a portable frame and a support mechanism connected to said frame supporting a coulter wheel on a central axis;
   (b) an arcuately shaped knife mounted on an arm of said support mechanism, said knife having a leading edge substantially complimentary in configuration to the outer periphery of said coulter wheel, said knife disposed rearwardly of said coulter and in partial surrounding relationship thereto, said knife positioned in uniform and adjacent generally skimming proximity to a portion of said coulter's outer periphery from a lowermost point of said leading edge located below and behind said central axis, to an uppermost point of said leading edge located above and behind said central axis of said coulter;
   (c) a liquid application conduit associated with said knife and connectable to a source of treating liquid for dispensing said liquid directly into a trench created by said coulter wheel; and
   (d) adjustment means consisting of a plurality of horizontal slots formed in said knife and a plurality of complementary fasteners extending from said arm of said support mechanism positioned to correspond with said slots and adapted to be horizontally movable therein, said adjustment means operative to uniformly vary the spacing between said knife and said coulter and to maintain said spacing at a uniform predetermined distance to compensate for wear.

2. A liquid fertilizer applicator as in claim 1 wherein a uniform gap defined between said outer periphery of said coulter wheel and said leading edge of said knife is no greater than one-eighth inch, whereby vegetable matter caught between said knife and said coulter may be sliced by the rotating action of said coulter against said knife.

3. A liquid fertilizer applicator as in claim 1 wherein the arc defined from the lowermost point of said coulter wheel to the lowest point of the knife's leading edge is greater than 30°.

4. A liquid fertilizer applicator as in claim 1 wherein said liquid application conduit is fixed to a trailing edge of said knife.

5. A liquid fertilizer applicator as in claim 4 wherein said liquid application conduit has a lower open end located higher than the lowest point of said knife's trailing edge, whereby said open end is shielded by said knife from soil and debris.

6. A liquid fertilizer applicator as in claim 5 wherein said knife includes a heel member at the lowermost point of the knife's trailing edge, said heel member extending rearwardly from said trailing edge beneath the open end of said liquid application conduit.

7. A liquid fertilizer applicator as in claim 1 wherein said knife has a lower facing edge extending from the lowermost point of the leading edge rearwardly and downwardly to a heel of said knife.

8. A liquid fertilizer applicator as in claim 7 wherein an angle of attack formed by said lower facing edge and a horizontal plane through said lower facing edge is not greater than 20°.

* * * * *

REEXAMINATION CERTIFICATE (1672nd)

United States Patent [19]
Williamson et al.

[11] B1 4,656,957
[45] Certificate Issued Apr. 7, 1992

[54] LIQUID FERTILIZER APPLICATOR

[75] Inventors: Gerald E. Williamson, Macomb; Carroll D. Noland, Rushville, both of Ill.

[73] Assignee: Yetter Manufacturing Company

Reexamination Request:
No. 90/001,541, Jun. 24, 1988

Reexamination Certificate for:
Patent No.: 4,656,957
Issued: Apr. 14, 1987
Appl. No.: 790,398
Filed: Oct. 23, 1985

Related U.S. Application Data

[63] Continuation-in-part of Ser. No. 682,280, Dec. 14, 1984, abandoned.

[51] Int. Cl.$^5$ .............................................. A01D 23/02
[52] U.S. Cl. .................................... 111/121; 172/166; 172/763
[58] Field of Search ....................................... 111/7, 86

[56] References Cited

U.S. PATENT DOCUMENTS

| | | | |
|---|---|---|---|
| 465,220 | 12/1891 | Steinke et al. | 111/86 |
| 3,188,989 | 6/1965 | Johnston | 111/7 |
| 4,671,193 | 6/1987 | States | 111/187 |

FOREIGN PATENT DOCUMENTS

2124062  2/1984  United Kingdom .................. 172/68

*Primary Examiner*—Danton D. DeMille

[57] ABSTRACT

A liquid fertilizer applicator is provided, designed to be pulled by a motive power source, for use in a variety of soil and tillage conditions. It includes a disc-shaped coulter and an associated applicator knife mounted in trailing relation to the coulter, with a feed tube fixed to the rear of the knife. The leading edge of the arcuate knife conforms to and lies in closed proximity to the outer periphery of the coulter disc. An alternative arrangement includes a knife with an angled lower facing edge and a heel extension to protect the feed tube opening.

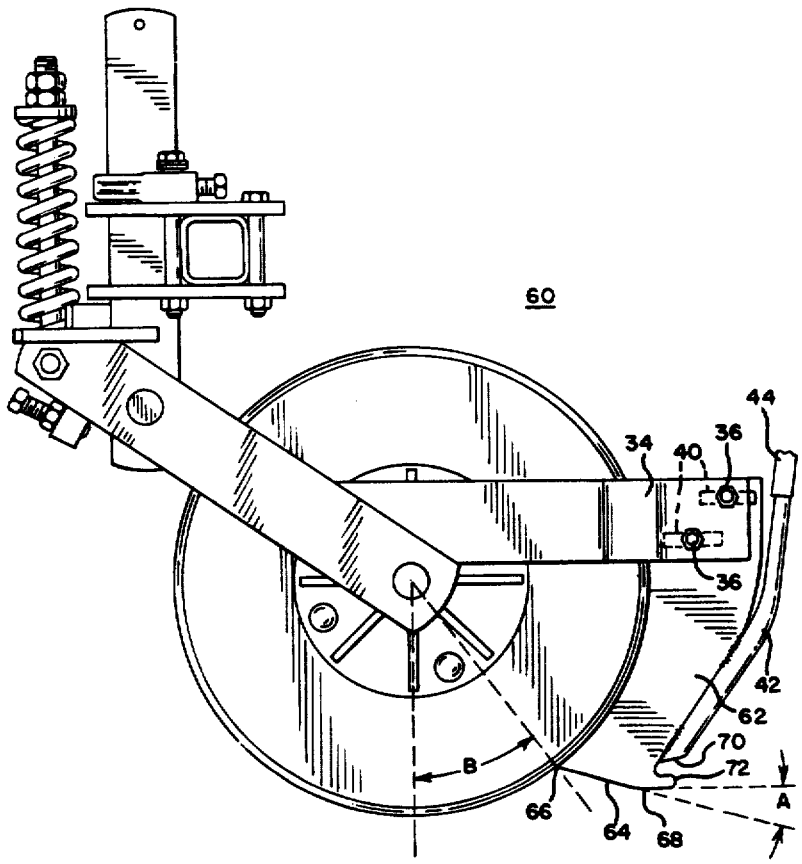

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7 and 8 is confirmed.

Claims 1-6 are cancelled.

* * * * *